US012732361B2

(12) United States Patent
Wright et al.

(10) Patent No.: US 12,732,361 B2
(45) Date of Patent: Sep. 8, 2026

(54) ENCRYPTION KEYS FOR MANAGEMENT CONTROLLERS

(71) Applicant: HEWLETT PACKARD ENTERPRISE DEVELOPMENT LP, Spring, TX (US)

(72) Inventors: Joseph Wright, Tomball, TX (US); Chris Davenport, Houston, TX (US); Robert L. Noonan, Crystal Lake, IL (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 289 days.

(21) Appl. No.: 18/422,691

(22) Filed: Jan. 25, 2024

(65) Prior Publication Data

US 2025/0247222 A1 Jul. 31, 2025

(51) Int. Cl.
*H04L 9/08* (2006.01)

(52) U.S. Cl.
CPC ............ *H04L 9/088* (2013.01); *H04L 9/0894* (2013.01)

(58) Field of Classification Search
CPC .............................. H04L 9/088; H04L 9/0894
See application file for complete search history.

(56) References Cited

U.S. PATENT DOCUMENTS

| | | | | |
|---|---|---|---|---|
| 2015/0010148 | A1* | 1/2015 | Polzin | G09C 1/00 380/44 |
| 2015/0095661 | A1* | 4/2015 | Sell | G06F 12/1408 713/193 |
| 2021/0377020 | A1* | 12/2021 | Kashid | H04L 9/083 |
| 2023/0119437 | A1* | 4/2023 | Faasse | G06F 1/3278 713/300 |
| 2023/0244413 | A1* | 8/2023 | Benhammadi | G06F 3/0655 711/154 |
| 2024/0143363 | A1* | 5/2024 | Lal | G06F 9/45558 |
| 2024/0291635 | A1* | 8/2024 | Morshed | H04L 9/0894 |

OTHER PUBLICATIONS

Apple Secure Enclavie, Article Protecting keys with the Secure Enclavie downloaded Dec. 25, 2023 (5 pages).
Wikipedia, Advanced Encryption downloaded Dec. 25, 2023 (14 pages).
Wikipedia, Symmetric key algorithm downloaded Dec. 14, 2023 (5 pages).

* cited by examiner

*Primary Examiner* — Hee K Song
(74) *Attorney, Agent, or Firm* — Trop, Pruner & Hu, P.C.

(57) ABSTRACT

In some examples, a security apparatus includes a security processor to control access to an encryption key in a memory region protected by the security apparatus. The security apparatus further includes a memory region controller that receives a request for the encryption key from an encryption engine associated with a management controller, the request being based on a memory alias provided from the management controller to the encryption engine, where the management controller is to invoke the encryption engine to encrypt data using the encryption key. Based on the request, the memory region controller provides the encryption key to the encryption engine.

20 Claims, 4 Drawing Sheets

ENCRYPTION KEYS FOR MANAGEMENT CONTROLLERS

BACKGROUND

Data encryption involves converting data from plaintext (which refers to the data in unencrypted form) to ciphertext (which refers to the data in encrypted form). Data is encrypted by applying a cryptographic function on the data using an encryption key. Encrypted data is accessible by an entity that has a decryption key. As a result, encrypted data is protected against unauthorized access by any entity that is not in possession of the decryption key.

BRIEF DESCRIPTION OF THE DRAWINGS

Some implementations of the present disclosure are described with respect to the following figures.

Figure 1:
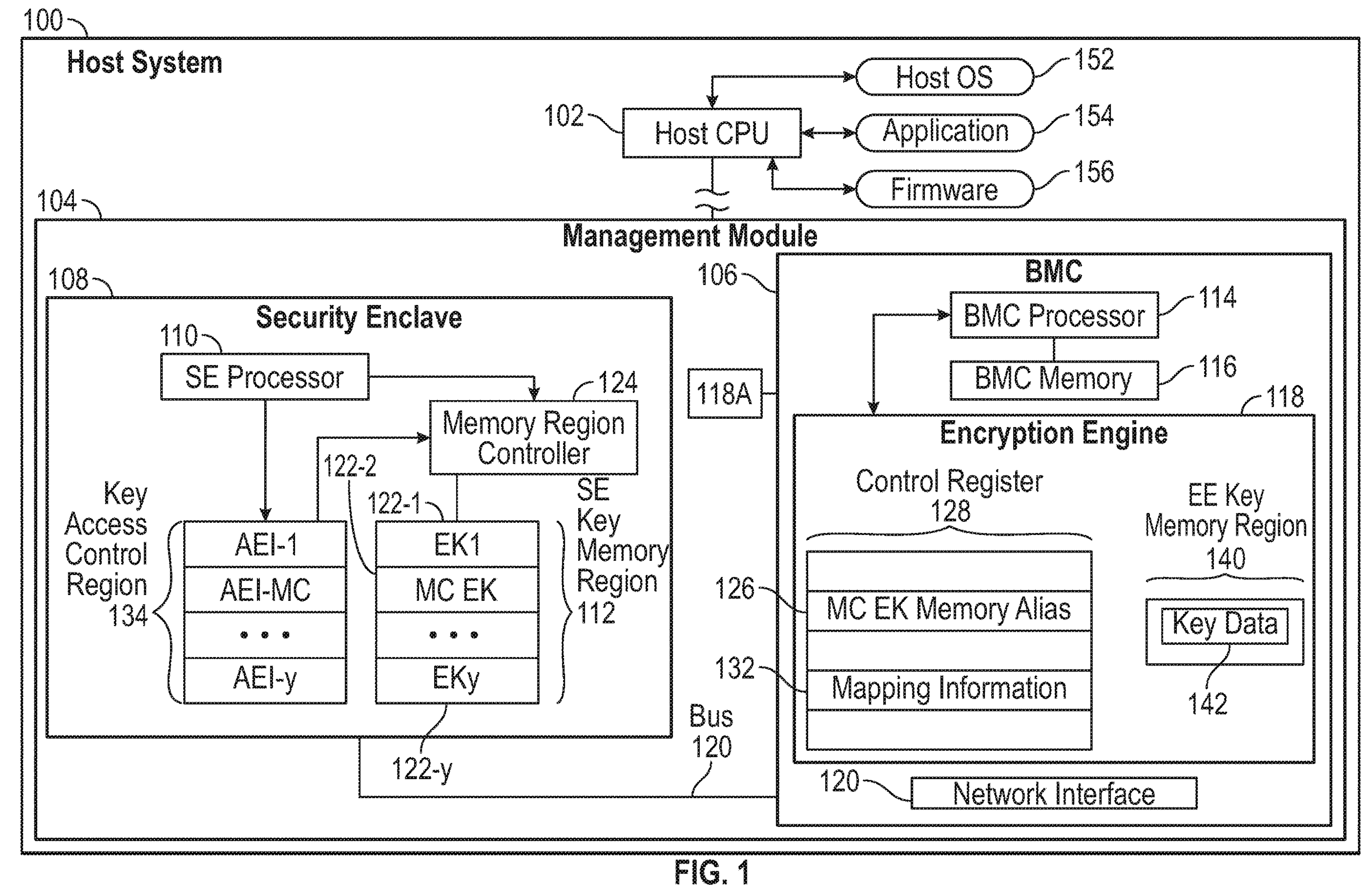
FIG. 1 is a block diagram of a host system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Attackers may attempt to gain access to encrypted data by determining a key that can be used to decrypt the encrypted data. The key used to decrypt the encrypted data may be the same as or different from the key used to encrypt the data. If symmetric data encryption is employed, then the same encryption key is used to both encrypt and decrypt data. If asymmetric data encryption is employed, the encryption key used to encrypt data is different from the decryption key used to decrypt encrypted data. As used here, an "encryption key" can refer to either a key used to encrypt data or a key used to decrypt encrypted data.

An attacker (e.g., a human, a program, or a machine) may intrude into a system to gain access to an encryption key, such as by retrieving the encryption key from a memory or by monitoring a communication link (hardware or software-based communication link) over which the encryption key may be transferred. Once an encryption key is compromised, the security of a system in which the compromised encryption key is used may be jeopardized.

In some systems, management controllers can be used to perform management tasks in the systems. A system that includes a management controller can be referred to as a "host system" that has an operating system (OS) (referred to as a "host OS") and a central processing unit (CPU) (referred to as a "host CPU") that are separate from the management controller. Some of the management tasks that can be performed by the management controller include security tasks that employ encryption keys. If an encryption key used by a management controller is compromised, then the management controller itself is compromised and the compromised management controller may be used by an attacker to gain access to the host system that includes the compromised management controller as well as any other system that is coupled to the host system. Additionally, a management controller may operate independently of the host CPU and the host OS that executes on the host CPU. Due to the independent operation of the management controller, the management controller, if compromised, may allow an attacker to perform covert unauthorized operations in the host system that cannot be detected by the host CPU or the host OS. The compromised management controller may be used as a launchpad for a broader attack beyond the host system, such as an attack into a network to which the host system is connected. The compromised management controller may be able to bypass or even modify security measures implemented in the host system or in the network. Thus, an organization's entire computing infrastructure (e.g., a data center, a cloud system, or any other computing environment) that includes the host system with the compromised management controller is threatened. An attacker may steal data stored in the computing infrastructure, perform unauthorized operations in the computing infrastructure, cause errors or other corruptions in operations of the computing infrastructure, or perform other unauthorized actions.

In accordance with some implementations of the present disclosure, a security enclave (SE) in a host system is used to securely store an encryption key (or more generally, a secret) that is to be used by a management controller (MC) in management tasks of the host system. The encryption key to be used by the management controller is referred to as an "MC encryption key." The security enclave includes a memory region (referred to as an "SE memory region") to store the MC encryption key, where the SE memory region is inaccessible to the management controller. The management controller uses an encryption engine to apply data encryption using the MC encryption key. Although the management controller does not have access to the MC encryption key stored in the SE memory region of the security enclave, the encryption engine has access to the SE memory region so that the encryption engine can obtain the MC encryption key from the SE memory region to use in encrypting data on behalf of the management controller.

In accordance with some implementations of the present disclosure, the management controller provides a memory alias to the encryption engine, which uses the memory alias to access the SE memory region to retrieve the MC encryption key from the SE memory region. The memory alias refers to information that provides a reference to a location of the MC encryption key in the SE memory region. For example, if the SE memory region includes multiple memory locations that store respective different encryption keys (including the MC encryption key), the memory alias can be in the form of a location identifier (e.g., location 1 or slot 1, location 2 or slot 2, etc.) to identify one of the memory locations of the SE memory region that contains the MC encryption key to be used by the management controller. Location "x" (where x refers to any of N memory locations, N≥1) can refer to the memory location of the SE memory region from which the encryption engine is to retrieve the MC encryption key.

In other examples, the memory alias can be in the form of a key identifier. Different key identifiers can identify different encryption keys in the SE memory region. In such latter examples, the management controller and the security enclave can coordinate with one another to map memory identifiers to respective different memory locations of the SE memory region. Mapping information that maps the encryption key identifier of the MC encryption key to a memory location of the SE memory region can be created, such as by the security enclave. The security enclave provides the mapping information to the management controller, which stores the mapping information in a memory of the management controller. The management controller can provide the key identifier of the MC encryption key to the encryption engine, which accesses the mapping information in the memory of the management controller to obtain the memory location of the MC encryption key in the SE memory region.

Techniques or mechanisms according to some implementations of the present disclosure protect a management controller encryption key from unauthorized access, even when a management controller such as a BMC is compromised. Protection of the management controller encryption key reduces the likelihood that a compromised management controller can be used as a launchpad for wider attacks against a computing environment.

FIG. 1 is a block diagram of a host system 100 that includes a host CPU 102 and a management module 104. Examples of the host system 100 can include any or some combination of the following: a computer (e.g., a desktop computer, a notebook computer, a tablet computer, a server computer, or another type of computer), a communication node (e.g., a switch, a router, a gateway, or another type of device that supports communications), a storage system, a game appliance, an Internet of Things (IoT) device, a household appliance, a vehicle, or any other type of electronic device.

The host CPU 102 can include one or more processors, which form a processing resource of the host system 100. The host CPU 102 executes primary machine-readable instructions such as a host OS 152, an application program 154, system firmware 156 (e.g., Basic Input/Output System (BIOS) code or Universal Extensible Firmware Interface (UEFI) code), or other software or firmware. A processor can include a microprocessor, a core of a multi-core microprocessor, a microcontroller, a programmable integrated circuit, a programmable gate array, or another hardware processing circuit. "Primary" machine-readable instructions are distinct (and separate) from machine-readable instructions (such as firmware or software) executable by other electronic components (separate from the host CPU 102). The primary machine-readable instructions may be stored in a storage medium (not shown in FIG. 1).

In further examples, the host system 100 may not execute a host OS or an application program, in which case the host OS 152 and the application program 154 are omitted.

The management module 104 includes a baseboard management controller (BMC) 106 and a security enclave 108. The BMC 106 is an example of a management controller that performs various management tasks of the host system 100. Details of a BMC are provided further below. The host CPU 102 may be coupled to the BMC 106, such as through an input/output (I/O) bridge (not shown), which is a device that interconnects different components.

The management module 104 can be implemented with an integrated circuit chip, with a circuit board, or with an arrangement of discrete electronic components. The BMC 106 performs various management tasks, which are discussed further below. Although reference is made to a BMC in some examples, other types of management controllers can be used in other examples. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

The BMC 106 is coupled over a bus 130 to the security enclave 108. The bus 130 can refer to any type of communication link over which electronic components are able to communicate, such as a memory bus, a storage bus, a network, or any other type of link (whether wired or wireless).

The security enclave 108 (also referred to as a security boundary or a security perimeter) includes a subsystem of the management module 104 for which access into and out of the subsystem is more tightly controlled than access of other subsystems of the management module 104. For example, the security enclave 108 is fully disposed inside a cryptographic boundary. A "cryptographic boundary" can refer to a continuous boundary, or perimeter, which contains the logical and physical components of a cryptographic subsystem, such as components of the security enclave 108. The security enclave 108, in accordance with some examples, is isolated from components outside the security enclave 108. The cryptographic boundary is defined using a secure access mechanism such as by using encryption or another type of access control to protect components in the security enclave 108 from unauthorized access by components outside the security enclave 108.

The security enclave 108 includes a security enclave (SE) processor 110 that can perform various security-related functions of the management module 104, including generating and/or maintaining keys related to cryptographic operations, such as encryption keys to encrypt information or private keys for signing information. The SE processor 110 can also maintain security certificates used to authenticate an identity of an entity such as a user, a program, a website, an organization, a device, a program, or any other type of entity. Further examples of security-related functionalities that can be performed by the SE processor 110 include root of trust operations (including measuring information such as machine-readable instructions or other information, performing signature verification, performing decryption, performing attestation, etc.), random number and entropy generation, or other security-related functionalities.

The security enclave 108 further includes an SE key memory region 112 to store one or more encryption keys. The SE key memory region 112 can be implemented using any arrangement of storage elements, such as register(s) or as part of a memory in the security enclave 108. A "memory" can be implemented using one or more memory devices, such as a dynamic random access memory (DRAM) device, a static random access memory (SRAM) device, a flash memory device, or any other type of memory device. A "register" refers to a small storage (e.g., smaller in size than a memory), which can be implemented using latches or other types of storage elements.

The SE key memory region 112 can be part of a specified memory space, such as the memory space of the management module 104 or the memory space of the host system 100. In examples where the SE key memory region 112 is implemented using register(s), the register(s) can be memory-mapped register(s) that is (are) part of the specified memory space.

In the example of FIG. 1, the SE key memory region 112 stores multiple encryption keys, including an encryption key EK1, a management controller (MC) encryption key (MC EK), and an encryption key EKy. More generally, the SE key memory region 112 can store just one encryption key, such as the MC EK. The different encryption keys are used for various different purposes. The MC EK is for use in management tasks performed by the BMC 106 (or more generally, by a management controller of the host system 100).

Access to the SE key memory region 112 is controlled by a memory region controller 124 in the security enclave 108 such that other entities of the host system 100, including the BMC 106, will not be able to access the SE key memory region 112 without the security enclave 108 first enabling such access.

In examples where the SE key memory region 112 is part of a memory in the security enclave 108, the memory region controller 124 includes a memory controller that is able to issue read and write access commands to the memory to access memory locations, including the memory locations of the SE key memory region 112. In other examples where the SE key memory region 112 is implemented using register(s), the memory region controller 124 can be implemented using hardware access logic associated with the register(s). In further examples, the memory region controller 124 is implemented using the SE processor 110.

The BMC 106 includes a BMC processor 114 that executes machine-readable instructions (firmware and/or software) of the BMC 106 to perform management tasks of the BMC 106. The BMC 106 further includes a BMC memory 116, which may be inside or outside of the BMC 106.

The BMC 106 may also include an encryption engine 118 to perform data encryption. In other examples, instead of the internal encryption engine 118 in the BMC 106, an external encryption engine 118A that is outside the BMC 106 can be used. In the latter examples, the external encryption engine 118A is connected to the BMC 106 such that the BMC 106 can invoke the encryption engine 118A to perform data encryption in management tasks performed by the BMC 106.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. For example, the encryption engine 118 or 118A can be a hardware encryption engine that performs data encryption using hardware processing circuitry (without executing machine-readable instructions) of the encryption engine 118 or 118A.

Alternatively, an "engine" can refer to a combination of one or more hardware processing circuits and machine-readable instructions (software and/or firmware) executable on the one or more hardware processing circuits. In such examples, the encryption engine 118 or 118A can execute machine-readable instructions (e.g., firmware or software) to perform data encryption.

In some examples, the encryption engine 118 or 118A can perform data encryption according to an Advanced Encryption Standard (AES) algorithm as established by the U.S. National Institute of Standards and Technology (NIST). In other examples, the encryption engine 118 or 118A can apply a different type of data encryption, such as according to a Rivest-Shamir-Adleman (RSA) algorithm, or any other encryption algorithms according to various encryption protocols, including standardized encryption protocols, open-source encryption protocols, or proprietary encryption protocols.

The BMC 106 further includes a network interface 120 to allow the BMC 106 to perform communications over a network (e.g., a management network) with an entity that is external of the BMC 106 (and which may be external of the host system 100). The network interface 120 can include a transceiver to transmit and receive signals, as well as any protocol layers to manage communications according to respective communication protocols.

Note that "encryption" of data can refer to either encrypting plaintext data into encrypted form, or decrypting encrypted data to derive plaintext data. In some examples, the network over which the BMC 106 communicates can be a secure channel in which data communicated over the secure channel is encrypted. The BMC 106 can invoke the encryption engine 118 to encrypt data to be sent over the secure channel, or decrypt encrypted data received over the secure channel. Other examples of scenarios in which the BMC 106 can encrypt or decrypt data are also applicable.

In accordance with some implementations of the present disclosure, the encryption engine 118 is provided with the MC EK in the SE key memory region 112 controlled by the security enclave 108. Note that although the ensuing discussion refers to the encryption engine 118, it is noted that techniques or mechanisms according to some examples can also be applied with the external encryption engine 118A.

The encryption engine (EE) 118 includes an EE key memory region 140 to store key data 142. The EE key memory region 140 can be implemented as part of a control register 128 or another register of the encryption engine 118. Alternatively, the EE key memory region 140 can be implemented using a memory in the encryption engine 118. The key data 142 written into the EE key memory region 140 can include the MC EK from the SE key memory region 112 in the security enclave 108.

Once provided with the MC EK, the encryption engine 118 is able to perform data encryption using the MC EK. However, the BMC 106 itself (or more specifically, components of the BMC 106 other than the encryption engine 118 in examples where the encryption engine 118 is part of the BMC 106), do not have access to the MC EK in the SE key memory region 112. For example, the BMC processor 114 has no access to the MC EK. In examples where the external encryption engine 118A is employed, the entirety of the BMC 106 has no access to the MC EK in the SE key memory region 112.

A component of the BMC 106 (other than the encryption engine 118) is disabled from having access to the MC EK in the SE key memory region 112 based on any of the following techniques: the BMC component is isolated by hardware from being able to read the SE key memory region 112, the BMC 106 is configured to not be able to issue reads of the SE key memory region 112, or any other disabling technique.

As a result of the inability of BMC components (other than the encryption engine 118) to access the MC EK, even if the BMC 106 were to become compromised, such as due to corruption of machine-readable instructions executed by the BMC processor 114, an attacker would not be able to gain access to the MC EK using the compromised BMC 106.

The SE key memory region 112 in the security enclave 108 may include different memory locations, including a memory location 122-1 to store the encryption key EK1, a memory location 122-2 to store the MC EK, and a memory location 122-*y* to store the encryption key EKy.

In some examples, to allow the encryption engine 118 access to the MC EK in the SE key memory region 112 of the security enclave 108, the encryption engine 118 is provided with an MC EK memory alias 126 that is stored in the control register 128 of the BMC 106. The control register 128 can be implemented using a hardware register of the encryption engine 118. In some examples, the MC EK memory alias 126 can be written to the control register 128 by the BMC processor 114, such as during a startup process (e.g., initial boot) of the BMC 106.

In addition to the MC EK memory alias 126, the control register 128 can include other information, such as a configuration related to an encryption algorithm (e.g., an AES algorithm) to be implemented by the encryption engine 118 when encrypting data. The control register 128 can include other information, such as control information to control the encryption engine 118 and status information for indicating a status of the encryption engine 118.

Based on the MC EK memory alias 126, the encryption engine 118 is able to obtain the MC EK from the memory location 122-2 in the SE key memory region 112 of the security enclave 108. For example, the encryption engine 118 can issue a fetch request over a bus 120 to the security enclave 108. The fetch request can include one or more signals, one or more messages, or any other information elements used to indicate a read of the memory location 122-2 containing the MC EK.

As noted above, a memory alias can include a location identifier that identifies a specific memory location of the SE key memory region 112. For example, the MC EK memory alias 126 can include a location identifier that identifies the memory location 122-2 (e.g., "location 2" or "slot 2"). Alternatively, MC EK memory alias 126 can be in the form of a key identifier that can be mapped to a memory location in the SE key memory region 112 using mapping information, such as mapping information 132 stored in the control register 128. Alternatively, the mapping information can be stored in a different memory.

The fetch request issued by the encryption engine 118 to the security enclave 108 includes a location identifier obtained by the encryption engine 118 based on the MC EK memory alias 126 in the control register 128 of the encryption engine 118. The location identifier in the fetch request can be included in the MC EK memory alias 126. Alternatively, the location identifier in the fetch request can be obtained by the encryption engine 118 by mapping a key identifier in the MC EK memory alias 126 to the location identifier, such as by accessing the mapping information 132.

In response to the fetch request, the memory region controller 124 can make a determination of whether access to the memory location 122-2 is to be granted. For example, the memory region controller 124 can access a key access control region 134 that stores access enable indicators (AEIs) that are associated with respective encryption keys in the SE key memory region 112. The key access control region 134 can be implemented using one or more hardware registers or in a memory of the security enclave 108.

An AEI if set to a disable value (e.g. "0") indicates that access to the corresponding encryption key is to be disabled. On the other hand, the AEI if set to an enable value (e.g., "1") indicates that access to the corresponding encryption key is enabled. In the example of FIG. 1, the key access control region 134 stores AEI-1, AEI-MC, . . . , AEI-y. AEI-1 controls (enables or disables) access to EK1, AEI-MC controls access to MC EK, and AEI-y controls access to EKy.

In response to the fetch request from the encryption engine 118 to access the memory location 122-2 containing MC EK, the memory region controller 124 determines the value of AEI-MC. If AEI-MC is set to the disable value (e.g., "0"), then the memory region controller 124 denies the fetch request. The memory region controller 124 can send an error indication back to the encryption engine 118 indicating that the fetch request has been rejected, or alternatively, the key data value provided from the memory location 122-2 of the SE key memory region 112 is an invalid value (e.g., a null value such as all zeros or some other null value). On the other hand, if AEI-MC is set to the enable value (e.g., "1"), then the memory region controller 124 grants the fetch request, and sends the MC EK to the encryption engine 118. At this point, the encryption engine 118 can use the MC EK in cryptographic operations that include encrypting data using the MC EK.

Figure 2A:
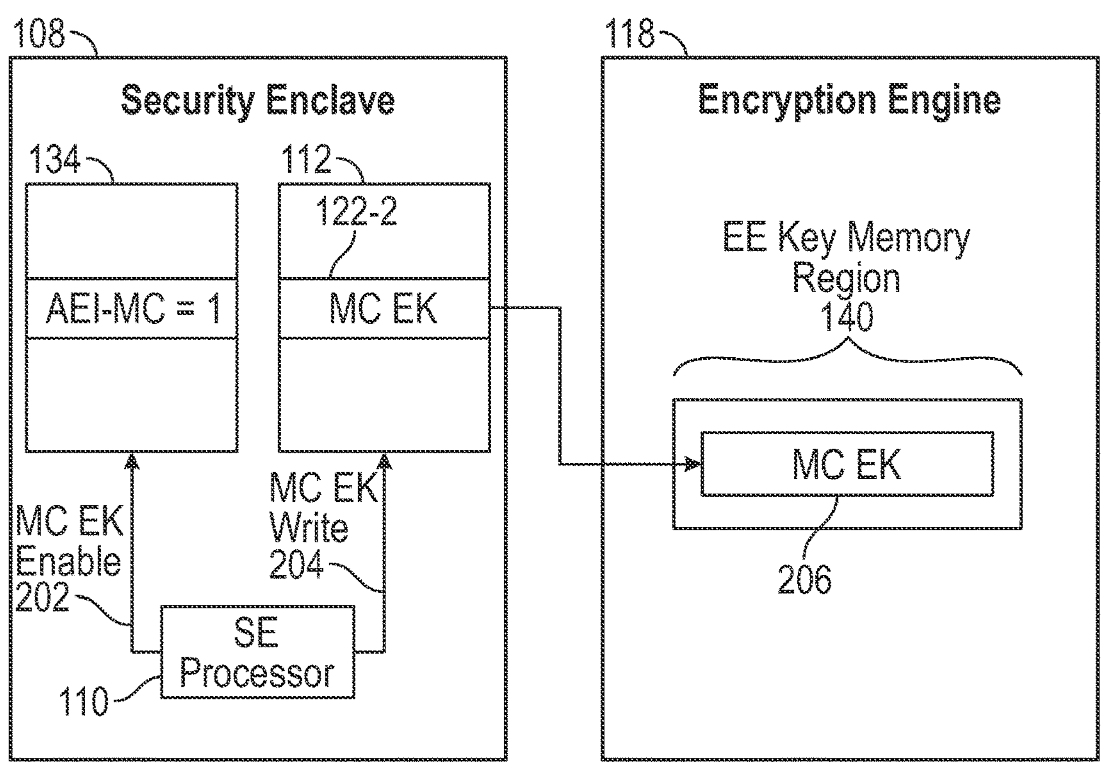
FIG. 2A and FIG. 2B are block diagrams of arrangements of enabling and disabling access of a management controller encryption key in a security enclave, according to some examples.

FIG. 2A shows an example of the security enclave 108 enabling access to the MC EK by the encryption engine 118. In FIG. 2A, the SE processor 110 issues an MC EK enable indication 202, which sets the value of AEI-MC in the key access control region 134 to the enable value (e.g., "1"). If the SE processor 110 has not already done so, the SE processor 110 can also write (at 204) the MC EK to memory location 122-2 in the SE key memory region 112. The MC EK in the memory location 122-2 in the SE key memory region 112 can be provided to the encryption engine 118 and stored as MC EK 206 in the EE key memory region 140 of the encryption engine 118. The MC EK 206 can be used by the encryption engine 118 to encrypt data when requested by the BMC 106.

After the SE processor 110 writes the MC EK to the memory location 122-2, the SE processor 110 can lock the memory location 122-2 to prevent any modification of the content of the memory location 122-2 until the SE processor 110 unlocks the memory location 122-2. The SE processor 110 can lock the memory location 122-2 by setting the memory region controller 124 with an indicator to prevent the memory region controller 124 from writing to the memory location 122-2.

Figure 2B:
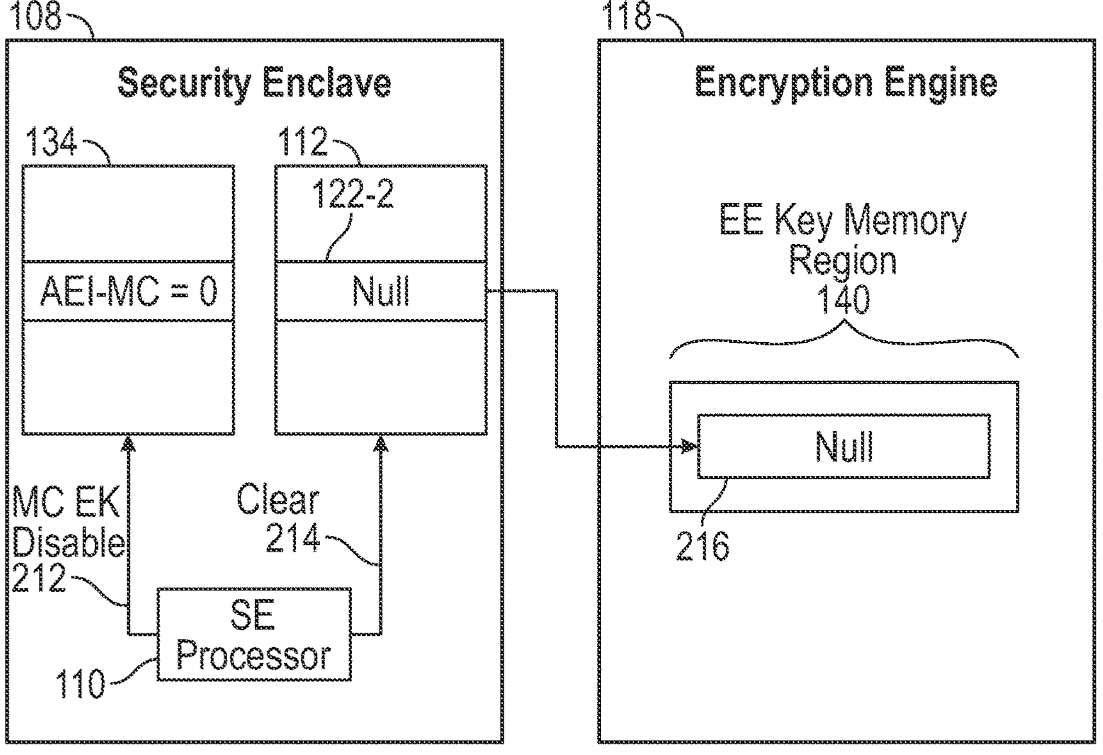

FIG. 2B shows an example of the security enclave 108 disabling access to the MC EK by the encryption engine 118. In FIG. 2B, the SE processor 110 issues an MC EK disable indication 212, which resets the value of AEI-MC in the key access control region 134 to the disable value (e.g., "0"). The SE processor 110 also clears (at 214) the memory location 122-2 to a null value (e.g., all zeroes). If requested by the encryption engine 118, the null value instead of the MC EK in the memory location 122-2 can be provided to the encryption engine 118 and stored as null value 216 in the EE key memory region 140 of the encryption engine 118. In this case, the encryption engine 118 does not have the MC EK and thus would not be able to encrypt data when requested by the BMC 106.

In some examples, the SE processor 110 in the security enclave 108 is able to monitor the BMC 106 to determine whether the BMC 106 has been compromised. For example, the SE processor 110 can monitor the BMC 106 by requesting that the BMC 106 sends a cryptographic hash value of machine-readable instructions (e.g., firmware or software) executed by the BMC 106. A cryptographic hash value is generated by applying a cryptographic hash function on the machine-readable instructions. The SE processor 110 can compare the cryptographic hash value to a target value, and if the values do not match, the SE processor 110 makes a determination that the BMC 106 is compromised.

In response to detecting that the BMC 106 has been compromised, the SE processor 110 issues the MC EK disable indication 212 (FIG. 2B) to the key access control region 134, which resets the value of AEI-MC in the key access control region 134 to the disable value (e.g., "0"). The SE processor 110 also clears (at 214) the memory location 122-2 to a null value (e.g., all zeroes). The SE processor 110 can also cause a restart of the encryption engine 118 so that the encryption engine 118 would have to re-obtain the key data to use for encryption operations. However, at this point, the memory location 122-2 contains the null value so that the encryption engine 118 is provided with the null value as the key data. Any encryption operations performed by the encryption engine 118 would produce invalid encrypted data since the key data is set to the null value. If the encryption engine 118 is unable to encrypt data properly, then the BMC 106 would lose its ability to perform security tasks that involve encryption of data, such as communicating over a secure channel.

Figure 3:
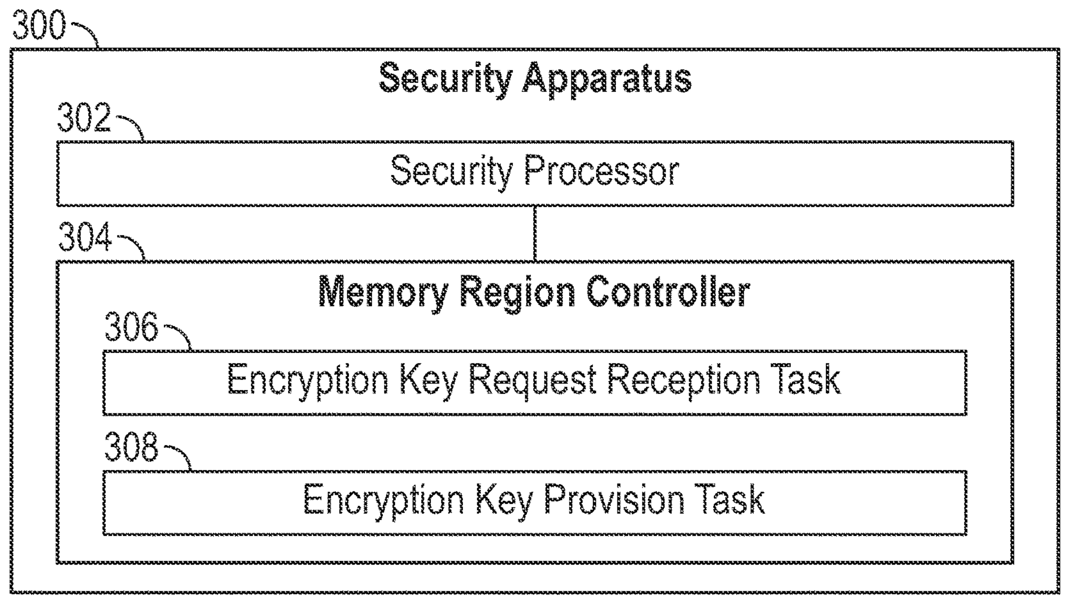
FIG. 3 is a block diagram of a security apparatus according to some examples.

FIG. 3 is a block diagram of a security apparatus 300 according to some examples of the present disclosure. The security apparatus 300 may be the security enclave 108, for example. The security apparatus 300 includes a security processor 302, such as the SE processor 110 of FIG. 1. The security processor 302 controls access to an encryption key (e.g., the MC EK of FIG. 1) in a memory region (e.g., the SE key memory region 112 of FIG. 1) protected by the security apparatus 300. The memory region can be part of the security apparatus 300.

The security apparatus 300 includes a memory region controller 304 to manage access of the memory region. The memory region controller 304 can be the memory region controller 124 of FIG. 1, for example. The memory region controller 304 can perform various tasks.

The tasks of the memory region controller 304 include an encryption key request reception task 306 to receive a request for the encryption key from an encryption engine (e.g., 118 or 118A in FIG. 1) associated with a management controller (e.g., the BMC 106 in FIG. 1). The request is based on a memory alias (e.g., 126 in FIG. 1) provided from the management controller to the encryption engine. The management controller is to invoke the encryption engine to encrypt data using the encryption key.

The tasks of the memory region controller 304 include an encryption key provision task 308 to provide the encryption key to the encryption engine based on the request. The encryption key provided to the encryption engine can be stored as key data in a memory region of the encryption engine.

In some examples, the security apparatus 300 stores an access enable indicator associated with a memory location in the memory region, where the memory location is to store the encryption key. The security processor 302 controls access to the encryption key in the memory region by setting a value of the access enable indicator.

In some examples, the access enable indicator when set to a first value disables access to the memory location, and the access enable indicator when set to a different second value enables access to the memory location.

In some examples, the security processor 302 writes an invalid key value to the memory location in the memory region in conjunction with setting the access enable indicator to the first value, and the security processor 302 writes a valid key value to the memory location in the memory region in conjunction with setting the access enable indicator to the second value. In such examples, the encryption engine is provided with the invalid key value in response to the request when the access enable indicator is set to the first value, and the encryption engine is provided with the valid key value in response to the request when the access enable indicator is set to the second value.

In some examples, the memory region includes a plurality of memory locations to store respective encryption keys including the encryption key associated with the management controller. The security apparatus 300 can store a plurality of access enable indicators associated with respective memory locations of the plurality of memory locations. The security processor 302 controls access to the plurality of memory regions by setting respective values of the plurality of access enable indicators.

In some examples, the security processor 302 writes the encryption key to a memory location in the memory region, and after writing the encryption key to the memory region, locks the memory location to prevent a modification of the encryption key.

In some examples, the security processor 302 detects that the management controller is compromised, and based on detecting that the management controller is compromised, writes an invalid key value to the memory region to prevent use of the encryption key.

Figure 4:
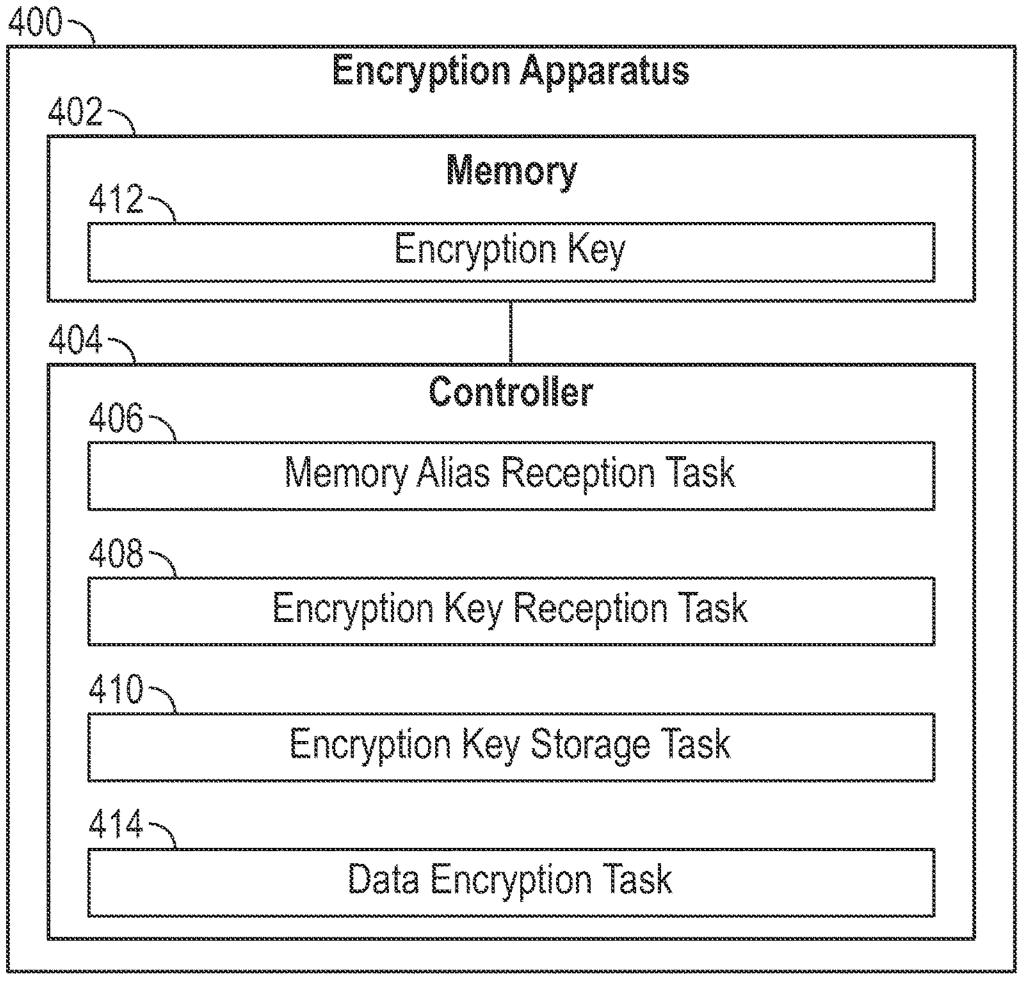
FIG. 4 is a block diagram of an encryption apparatus according to some examples.

FIG. 4 is a block diagram of an encryption apparatus 400 according to some examples. The encryption apparatus 400 may be the encryption engine 118 or 118A of FIG. 1, for example.

The encryption apparatus 400 includes a memory 402, which can be implemented using a register or any other arrangement of storage elements. The encryption apparatus 400 includes a controller 404 to perform various tasks. The tasks of the controller 404 can include a memory alias reception task 406 to receive a memory alias for an encryption key in a memory location in a security enclave. The memory alias may be provided by the BMC processor 114, for example, such as during a startup of the BMC 106.

The tasks of the controller 404 can include an encryption key reception task 408 to receive, based on the memory alias, the encryption key from the security enclave. The controller 404 of the encryption apparatus 400 may fetch the encryption key from the security enclave by issuing a fetch request that contains a location identifier of a memory location of the encryption key.

The tasks of the controller 404 can include an encryption key storage task 410 to store the encryption key (412) in the memory 402 of the encryption apparatus 400. The tasks of the controller 404 can include a data encryption task 414 to encrypt data using the encryption key 412 (retrieved from the memory 402) based on invocation of the encryption apparatus by a management controller as part of a security operation performed by the management controller.

In some examples, the memory location in the security enclave that contains the encryption key is inaccessible to a processor of the management controller.

In some examples, the controller 404 determines a location identifier of the memory location based on the memory alias, and the controller 404 uses the location identifier to fetch the encryption key from the memory location in the security enclave.

In some examples, the controller 404 determines the location identifier of the memory location by extracting the location identifier from the memory alias.

In some examples, the controller 404 determines the location identifier of the memory location by extracting a key identifier of the encryption key from the memory alias, and accessing mapping information that maps the key identifier to the location identifier.

Figure 5:
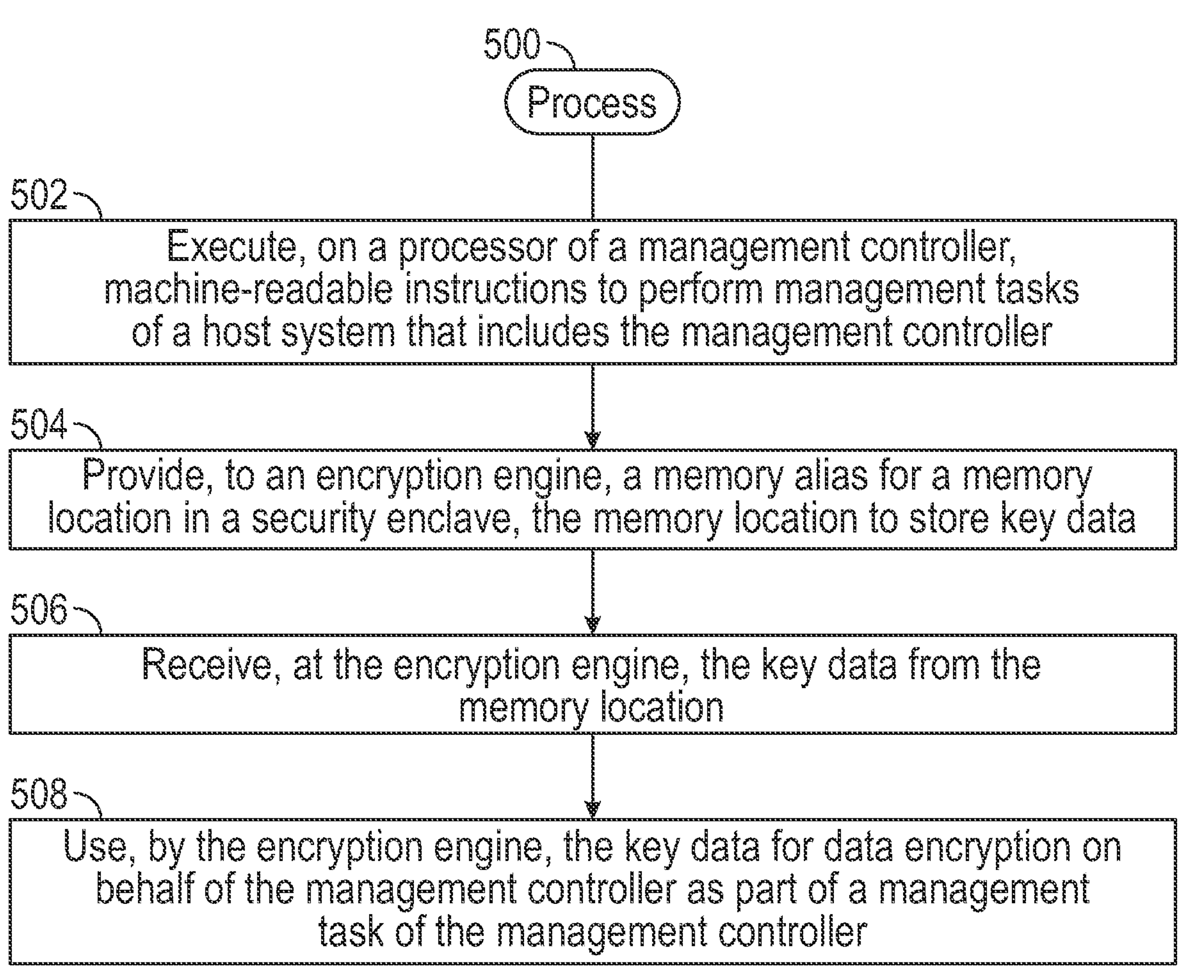
FIG. 5 is a flow diagram of a process according to some examples.

FIG. 5 is a flow diagram of a process 500 according to some examples. The process 500 may be performed in a host system, such as the host system 100 of FIG. 1.

The process 500 includes executing (at 502), on a processor of a management controller, machine-readable instructions to perform management tasks of a host system that includes the management controller. The processor of the management controller may be the BMC processor 114 of FIG. 1, for example.

The process 500 includes providing (at 504), to an encryption engine, a memory alias for a memory location in a security enclave, the memory location to store key data. In some examples, the memory alias can be provided by the management controller to the encryption engine.

The process 500 includes receiving (at 506), at the encryption engine, the key data from the memory location. The received key data may be an encryption key (if the security enclave has enabled access to the encryption key) or invalid null data (if the security enclave has disabled access to the encryption key).

The process 500 includes using (at 508), by the encryption engine, the key data for data encryption on behalf of the management controller as part of a management task of the management controller. For example, the encryption engine performs the data encryption on behalf of the management controller responsive to being invoked by the management controller.

In some examples, the key data received at the encryption engine from the memory location in the security enclave includes an encryption key that is accessible by the encryption engine but inaccessible to the processor of the management controller.

A "BMC" (e.g., the BMC 106 of FIG. 1) can refer to a specialized service controller that monitors the physical state of an electronic device using sensors and communicates with a remote management system (that is remote from the electronic device) through an independent "out-of-band" connection. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access of the electronic device (to access the electronic device over a network, for example), remote reboot of the electronic device (to trigger the computer system to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an OS is not installed or not functional on the electronic device.

Moreover, in some examples, the BMC can run on auxiliary power provided by an auxiliary power supply (e.g., a battery); as a result, the electronic device does not have to be powered on to allow the BMC to perform the BMC's operations. The auxiliary power supply is separate from a main power supply that supplies powers to other components (e.g., a main processor, a memory, an input/output (I/O) device, etc.) of the electronic device.

Various tasks discussed herein according to some examples may be implemented with machine-readable instructions, which can be stored in a storage medium. A storage medium can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A security apparatus comprising:

a security processor to control access to an encryption key in a memory region protected by the security apparatus; and a memory region controller to:

receive a request for the encryption key from an encryption engine associated with a management controller, the encryption engine outside the security apparatus, the request comprising a location identifier based on a memory alias provided from the management controller to the encryption engine, the location identifier identifying a memory location in the memory region, wherein the management controller is to invoke the encryption engine to encrypt data using the encryption key, and based on the request, access the encryption key from the memory location identified by the location identifier, and provide the encryption key from the memory region controller to the encryption engine.

2. The security apparatus of claim 1, wherein the memory region is inside the security apparatus.

3. The security apparatus of claim 1, further comprising:
an access enable indicator associated with the memory location storing the encryption key in the memory region,
wherein the security processor is to control access to the encryption key in the memory region by setting a value of the access enable indicator.

4. The security apparatus of claim 3, wherein the access enable indicator when set to a first value disables access to the memory location, and the access enable indicator when set to a different second value enables access to the memory location.

5. The security apparatus of claim 4, wherein the security processor is to write an invalid key value to the memory location in the memory region in conjunction with setting the access enable indicator to the first value, and
wherein the security processor is to write a valid key value to the memory location in the memory region in conjunction with setting the access enable indicator to the second value.

6. The security apparatus of claim 5, wherein the encryption engine is provided with the invalid key value in response to the request when the access enable indicator is set to the first value, and
wherein the encryption engine is provided with the valid key value in response to the request when the access enable indicator is set to the second value.

7. The security apparatus of claim 3, wherein the memory region comprises a plurality of memory locations to store respective encryption keys including the encryption key associated with the management controller.

8. The security apparatus of claim 7, comprising:
a plurality of access enable indicators associated with respective memory locations of the plurality of memory locations,
wherein the security processor is to control access to the plurality of memory locations by setting respective values of the plurality of access enable indicators.

9. The security apparatus of claim 1, wherein the security processor is to:
write the encryption key to the memory location in the memory region, and
after writing the encryption key to the memory region, lock the memory location to prevent a modification of the encryption key.

10. The security apparatus of claim 1, wherein the security processor is to:
detect that the management controller is compromised; and
based on detecting that the management controller is compromised, write an invalid key value to the memory region to prevent use of the encryption key.

11. The security apparatus of claim 10, wherein the security processor is to further:
based on detecting that the management controller is compromised, set an access enable indicator associated with the memory location storing the encryption key in the memory region to a disable value to disable access to the memory location.

12. An encryption apparatus comprising:
a memory; and
a controller to:
receive a memory alias for an encryption key in a memory location in a security enclave, the encryption apparatus outside the security enclave;
obtain, based on the memory alias, a location identifier identifying the memory location containing the encryption key in the security enclave;
send, from the encryption apparatus to the security enclave, a request for the encryption key, the request comprising the location identifier;
receive, as a response to the request, the encryption key from the security enclave;
store the encryption key in the memory of the encryption apparatus; and
encrypt data using the encryption key based on invocation of the encryption apparatus by a management controller as part of a security operation performed by the management controller.

13. The encryption apparatus of claim 12, wherein the memory location in the security enclave that contains the encryption key is inaccessible to a processor of the management controller.

14. The encryption apparatus of claim 12, wherein the controller is to:
obtain the location identifier identifying the memory location by extracting the location identifier from the memory alias.

15. The encryption apparatus of claim 12, wherein the controller is to obtain the location identifier identifying the memory location by:
extracting a key identifier of the encryption key from the memory alias, and
accessing mapping information that maps the key identifier to the location identifier.

16. A method comprising:
executing, on a processor of a management controller, machine-readable instructions to perform management tasks of a host system that includes the management controller;
providing, to an encryption engine, a memory alias for a memory location in a security enclave, the memory location to store key data, and the encryption engine outside the security enclave;
obtaining, by the encryption engine based on the memory alias, a location identifier identifying the memory location storing the key data in the security enclave;
sending, from the encryption engine to the security enclave, a request for the key data, the request comprising the location identifier;
receiving, at the encryption engine as a response to the request, the key data from the memory location; and
using, by the encryption engine, the key data for data encryption on behalf of the management controller as part of a management task of the management controller.

17. The method of claim 16, wherein the key data received at the encryption engine from the memory location in the security enclave comprises an encryption key that is accessible by the encryption engine but inaccessible to the processor of the management controller.

18. The method of claim 17, wherein the key data from the security enclave comprises the encryption key responsive to the security enclave enabling access to the memory location.

19. The method of claim 18, wherein the key data received at the encryption engine from the memory location in the security enclave comprises an invalid value responsive to disabling access to the memory location.

20. The method of claim 16, wherein the encryption engine performs the data encryption on behalf of the management controller responsive to being invoked by the management controller.

* * * * *